June 2, 1953 — J. S. MICHIE — 2,640,365
LOW-FRICTION VARIABLE PULLEY DISK MOUNTING
Filed Nov. 18, 1949
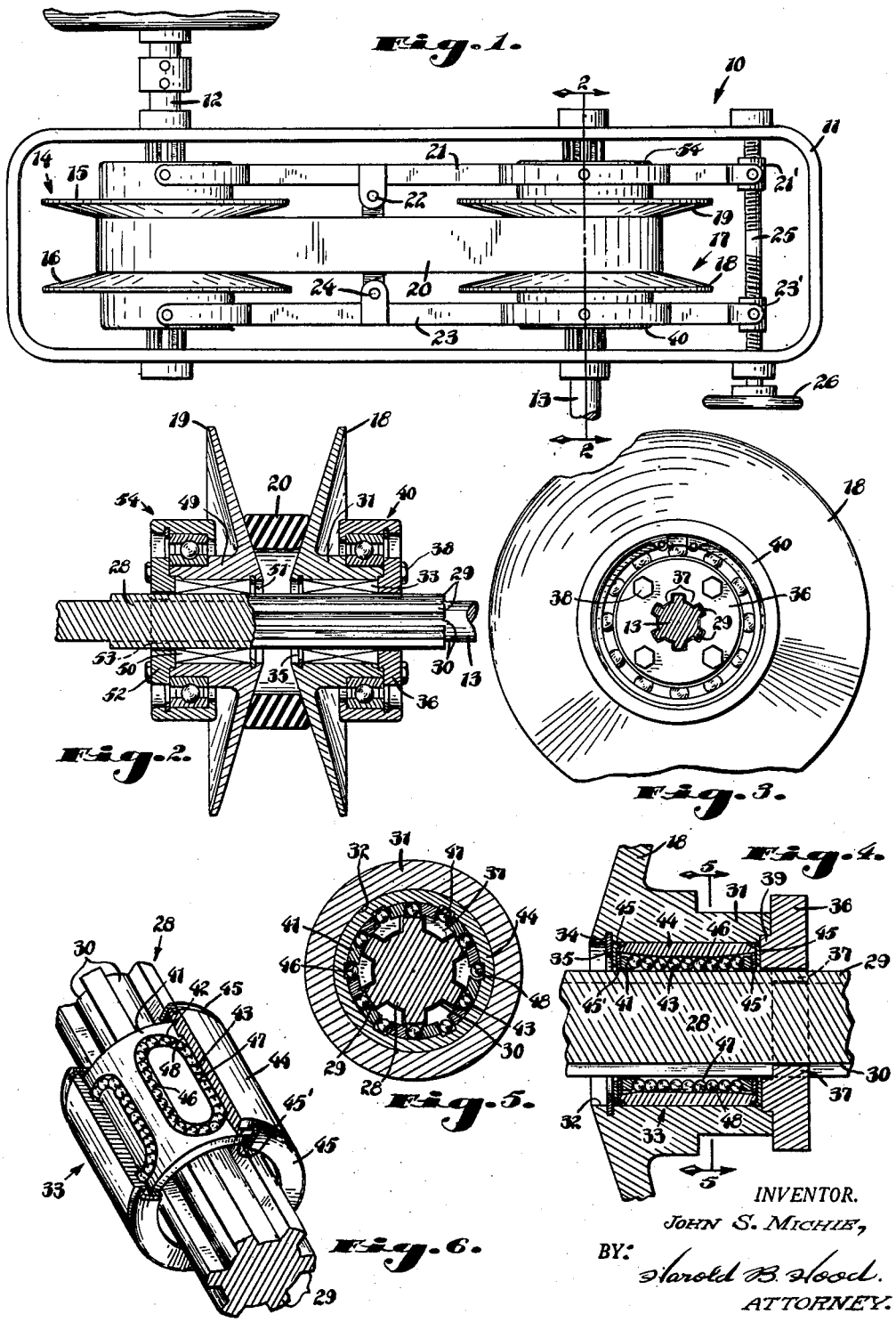
INVENTOR.
JOHN S. MICHIE,
BY: Harold B. Hood
ATTORNEY.

Patented June 2, 1953

2,640,365

UNITED STATES PATENT OFFICE 2,640,365

LOW-FRICTION VARIABLE PULLEY DISK MOUNTING

John S. Michie, Columbus, Ind., assignor to Reeves Pulley Company, Columbus, Ind., a corporation of Indiana Application November 18, 1949, Serial No. 128,101

9 Claims. (Cl. 74—230.17)

The present invention relates to a low-friction variable pulley disc mounting, and is primarily concerned with the provision of means whereby an element, mounted on a shaft for axial reciprocation relative thereto, but rotationally drivingly connected thereto, may be supported on said shaft to move freely in an axial direction with a minimum of frictional resistance and with a minimum requirement for lubrication.

The invention is particularly applicable to the mounting of the shiftable elements of expansible V-pulleys used in the well known "Reeves" type of variable speed power transmissions. In such an organization, two mating coned discs cooperate with an edge-active friction belt. Each of those discs must be rotationally fixed with respect to the shaft upon which the pulley is supported, but one or both of said discs, must be axially movable relative to the shaft in order to vary the distance between the apices of said discs, thereby varying the depth of penetration of the belt between the discs, and so varying the effective pitch diameter of the pulley. It is essential that there shall be no rotational slip between the two discs, or between the discs and the shaft; and it is essential that the discs shall be maintained in absolute axial alignment without any substantial canting of either disc. Yet freedom of relative axial movement between the discs is essential, since sticking of any movable disc will, of course, interfere with accurate and sensitive adjustment of the transmission.

Obviously, in order to guard against canting of a disc, a bearing engagement of substantial length must be provided between the disc and the shaft. Additionally, in order to guard against any relative rotational movement between the two discs, which would, of course, result in serious attrition upon the active edges of the belt, it is essential that the means providing a driving connection between the shaft and the discs shall be peripherally tight-fitting. Because of these two requirements, a splined connection between the shaft and the discs has heretofore been found not altogether satisfactory, since a splined connection long enough to guard against disc canting and tight enough to guard against relative rotational movement between the discs involves an area of frictional engagement between the shaft and the discs so great as to prevent that freedom of axial movement of the discs relative to the shaft which is essential to satisfactory operation of a transmission of the character under consideration. Additionally, such a splined connection involves problems of lubrication which are substantially insoluble, particularly where the unit is to be used in an environment such that lubrication drippage must be prevented.

Consequently, the art has consistently turned to the use of keyed connections between the shaft and the discs; with all of the attendant disadvantages of such a connection. While the keyed connection does not, to an optimum degree, either satisfy the requirements of the unit or overcome the problem of lubrication and cleanliness, it has been necessary to compromise upon such a connection, for lack of any satisfactory solution of the problem.

According to the present invention, a mounting means, including a splined connection between the disc and the shaft, and an anti-friction mounting of the disc upon the shaft, has been provided, of such character as to satisfy all of the above requirements, while necessitating a minimum amount of lubrication. The structure adopted for the accomplishment of those objectives includes a ball bushing of substantial axial length, interposed between a shaft and a disc to be mounted thereon, and supported upon the shaft, together with a spline wheel, fixed to the disc and the bushing, and meshing with a splined portion of the shaft. The ball bushing, known prior to my invention as a unit capable of free relative axial movement upon a shaft, has always been considered as a unit incapable of use in an environment in which it must be rotationally fixed to the shaft; and a major feature of my invention is the recognition of the adaptability of such a unit to an environment in which the ball bushing is rotationally fixed with respect to the shaft upon which it is axially free to move.

Further features and objects of the invention will appear as the description proceeds.

To the accomplishment of the above and related objects, my invention may be embodided in the form illustrated in the accompanying drawings, attention being called to the fact, however, that the drawings are illustrative only, and that changes may be made in the specific construction illustrated and described, so long as the scope of the appended claims is not violated.

Fig. 1 is a more or less diagrammatic plan view of one form of variable speed transmission in which my invention finds utility;

Fig. 2 is an enlarged transverse section taken substantially on the line 2—2 of Fig. 1;

Fig. 3 is a broken end elevation, taken from the right end of Fig. 2;

Fig. 4 is a further enlarged fragmentary axial section, showing details of the mounting of the present invention;

Fig. 5 is a transverse section taken substantially on the line 5—5 of Fig. 4; and Fig. 6 is a broken perspective view of the ball bushing employed in my invention and its mounting upon a splined shaft section.

Referring more particularly to the drawings, it will be seen that I have illustrated, more or less diagrammatically, a "Reeves" variable speed transmission, indicated generally by the reference numeral 10 and comprising a frame 11 in which are journalled an input shaft 12 and an output shaft 13. The shaft 12 carries, within the frame, an expansible V-pulley 14 comprising the discs 15 and 16; while the output shaft carries an expansible V-pulley 17 comprising the discs 18 and 19. An edge-active belt 20 is trained over the two pulleys 14 and 17 to provide a driving connection therebetween. A lever 21, pivotally mounted at 22, operatively engages anti-friction thrust bearings associated with the discs 15 and 19, while a similar lever 23, pivotally mounted at 24, operatively engages similar thrust bearings associated with the discs 16 and 18. Nuts 21' and 23', connected to the levers 21 and 23 respectively, are threadedly engaged upon oppositely threaded portions of an adjusting screw 25 journalled in the frame 11. As is well understood in the art, rotation of the hand wheel in one direction will move the nuts 21' and 23' toward each other to separate the discs 15 and 16 and to move the discs 18 and 19 toward each other, thereby decreasing the speed of the shaft 13 relative to that of the shaft 12, while rotation of the hand wheel in the opposite direction will produce an opposite movement of the said discs to increase the speed of the shaft 13.

Thus far, the construction is conventional. According to the present invention, the mid-portion of each shaft 12 and 13 will be formed to provide a splined section 28 comprising a peripheral series of axially extending spline teeth 29 separated or defined by longitudinally extending grooves 30. The disc 18, for instance, is provided with an axially elongated hub 31 retreating from the apex of its coned face, and provided with an axial bore 32 somewhat larger in diameter than the spline teeth 29. Within the bore 32 of the hub 31 is snugly received a ball bushing indicated generally by the reference numeral 33, and to be described in detail hereinafter. As shown, the bushing 33 abuts, at one end, a snap ring 35 received in a suitable groove 34 in the hub 31; and a spline ring 36, having a peripheral series of teeth 37 received in the grooves 30 between the teeth 29, is fixed to the rear end of the hub 31 as, for instance, by a series of screws 38. Said ring is provided with an axial projection 39 which abuts the rear end of the bearing 33, whereby said bearing is axially fixed with respect to the disc hub 31. The conventional anti-friction thrust bearing 40 is suitably mounted upon the hub 31 for engagement by, for instance, the lever 23.

The bearing 33 comprises a carrier 41 formed to provide a peripheral series of round trackways 42. In each trackway is carried a continuous series of balls 43. An outer shell or housing 44 non-rotatively surrounds the carrier 41 and closure rings 45, with which may be associated felt wiper rings 45', retain the carrier 41 in fixed axial association with the shell 44.

Each trackway includes an axially-extending rectilinear portion 46 radially opening both inwardly and outwardly to an extent sufficient to permit the balls 43 currently located therein to project slightly beyond the inner periphery of the carrier 41 and beyond the outer periphery thereof. Each trackway further comprises a rectilinear, axially extending portion 47 peripherally spaced from the section 46 and so constructed and designed as to lift the balls in that section radially outwardly so that such balls do not project beyond the inner periphery of the carrier, but do project, to a greater degree, beyond the outer periphery thereof. The inner periphery of the shell 44 is formed with longitudinally extending grooves 48 registering with the trackway sections 47, so that the balls 43, currently located in each trackway 47, project freely into such grooves 48. At their axially opposite ends, the trackway sections 46 and 47 are joined by part-circular sections, as shown, so that the series of balls in only one trackway may roll continuously, in either direction, round and round the trackway. It will be clear that the projection of the balls located in the trackway sections 47 into the grooves 48 will hold the shell 44 and carrier 41 against relative rotational movement, although, in the environment in which the bushing is shown in the present disclosure, those elements are not subjected to any forces tending to produce such rotation, since the shaft 13 and the disc hub 31, respectively engaging the parts of the bushing, are held against relative rotational movement by the spline ring 36.

The parts are so assembled that the balls located in each trackway section 46 register with, and are supported upon, the outermost surface of a spline tooth 29, while the balls located in each trackway section 47 register with a spline groove 30. The relatively long series of balls in the trackway sections 46 provide a sufficiently long bearing upon the spline teeth 29 to obviate the possibility of canting of the disc relative to the shaft. It will be noted that the spline teeth 37 are axially very short, whereby the total area of frictional contact between said spline teeth 37 and the teeth 29 is not greater than would be the total area of frictional engagement in a keyed construction of conventional character. Because the bushing 33 sufficiently guards against canting, the spline teeth 37 need not engage the bottoms of the grooves 39, and the spline teeth 29 need not engage the bottoms of the spaces between the teeth 37.

In practice, it has been found that, since six bearing lines can be provided in each hub, the length of each disc hub may be reduced, as compared to conventional keyed construction, thereby improving the compactness of the entire unit as compared to conventional construction.

In the illustrated embodiment of the invention, the disc 19 is similarly mounted on the shaft 13, being provided with a hub 49 in which is received a bushing 50 identical in construction to the bushing 33, and held in place in the hub between a snap ring 51 and a spline ring 52 suitably secured to the free end of the hub 49 and provided with spline teeth 53. A conventional anti-friction thrust bearing 54 is mounted on the hub 49 for engagement by the lever 21.

The pulley 14 will be constructed in a similar fashion, the hubs of its discs 15 and 16 being supported on a splined section of the shaft 12 through ball bushings like 33 and 50 and similar spline rings. While the illustrated arrangement of parts is presently believed to be optimum, variations therefrom are possible. For instance, the spline ring might be mounted at that end of the hub which coincides with the apex of the coned disc; or one disc might be fixed to the shaft while the other disc is mounted on the shaft in the manner illustrated, or is mounted upon a projecting, splined section of a hub carried by the fixed disc.

While the invention is deemed to be of primary utility in the illustrated environment, it is by no means limited to that environment, but may be applied to any organization in which it is desired to provide an anti-friction, axial adjustment for an element having a driving connection with a shaft.

Throughout the present specification, and in the claims appended hereto, the term "ball bushing" is used to mean a unit of the type indicated herein by the reference numeral 33, and including a carrier providing a peripheral series of continuous trackways, each having an axially rectilinear section 46, in which the balls project radially inwardly into supporting engagement with a shaft or the like, and a return section, such as 47, peripherally spaced from the first-named axially rectilinear section in which the balls are held out of engagement with the element upon which the bushing is supported, the sections 46 and 47 being connected so that the balls may roll freely and continuously, in either direction, through a closed path.

I claim as my invention:

1. An expansible V-pulley mounting comprising a splined shaft, a coned disc mounted on said shaft to rotate therewith, and a mating coned disc mounted on said shaft to rotate therewith and for axial adjustment therealong relative to said first-named disc, a "ball bushing" supporting said mating disc upon the splined region of said shaft, and means fixed with respect to said mating disc and interdigitated with the splined region of said shaft.

2. An expansible V-pulley mounting comprising a shaft provided with a peripheral series of spline teeth defined by spline grooves, a coned disc mounted on said shaft to rotate therewith, a mating coned disc, a "ball bushing" supporting said mating coned disc on said spline teeth, and means fixed with respect to said mating coned disc and slidably received in said spline grooves to provide a driving connection between said shaft and said mating coned disc.

3. An expansible V-pulley mounting comprising a shaft provided with a peripheral series of spline teeth defined by spline grooves, a coned disc mounted on said shaft to rotate therewith, a mating coned disc, said mating coned disc having an axially-elongated hub retreating from the apex of the coned face thereof, a "ball bushing" received within said hub and fixed against axial movement relative thereto, said bushing being supported on said spline teeth, and a toothed element fixed to said hub at an end thereof and meshing with said spline grooves.

4. The assembly of claim 3 in which said toothed element is provided with a peripheral series of radially-inwardly directed teeth engaging in said spline grooves, the axial length of said teeth being substantially less than the axial length of said bushing.

5. The assembly of claim 3 including a snapring received in said hub adjacent said apex and abutting one end of said bushing and in which said toothed element is removably fixed to the remote end of said hub and abuts the other end of said bushing.

6. An expansible V-pulley mounting comprising a splined shaft, a cooperating pair of coned discs mounted on said shaft, a "ball bushing" for each of said discs, each bushing being axially fixed relative to its disc and being supported upon the splined portion of said shaft, and other means fixed with respect to each disc and interdigitated with the splined portion of said shaft to provide a rotary driving connection between said shaft and its disc.

7. For association with a shaft provided with a peripheral series of spline teeth defined by spline grooves, a power-transmitting element having a hub, a "ball bushing" received in said hub and axially fixed relative thereto, said bushing being adapted to be supported on said spline teeth, and an element fixed to an end of said hub and provided with a peripheral series of radially-inwardly directed teeth adapted to mesh with said spline grooves.

8. The device of claim 7 in which each of said teeth of said element is axially substantially shorter than said bushing.

9. In combination, a splined shaft and a power-transmitting assembly mounted thereon for axial movement therealong, comprising a power-transmitting element having a hub, and a "ball bushing" received within said hub and supported on said shaft and comprising a carrier providing a peripheral series of continuous trackways, each having an axially rectilinear section and a return section peripherally spaced from said axially rectilinear section and connected to the latter to define a continuous, closed path, and a series of balls received in each trackway, the balls in said axially rectilinear section of each trackway projecting radially inwardly into supporting engagement with a land of said splined shaft and the balls in said return section of each trackway being held radially out of engagement with said shaft, the balls in each trackway being free to roll continuously in either direction through the closed path defined by such trackway, said assembly including means providing a rotational driving connection between said shaft and said power-transmitting element.

JOHN S. MICHIE.

References Cited in the file of this patent

UNITED STATES PATENTS

| Number    | Name     | Date          |
|-----------|----------|---------------|
| 754,066   | Hoffmann | Mar. 8, 1904  |
| 851,728   | Bayrer   | Apr. 30, 1907 |
| 1,375,053 | Lewellen | Apr. 19, 1921 |
| 2,371,330 | Irstad   | Mar. 13, 1945 |
| 2,503,009 | Thompson | Apr. 4, 1950  |

FOREIGN PATENTS

| Number  | Country | Date         |
|---------|---------|--------------|
| 862,230 | France  | Mar. 1, 1941 |